3,341,823
SIMPLIFIED STATISTICAL SWITCH
Edward M. Connelly, Springfield, Va., assignor to Melpar, Inc., Falls Church, Va., a corporation of Delaware
Filed Jan. 7, 1965, Ser. No. 424,062
8 Claims. (Cl. 340—172.5)

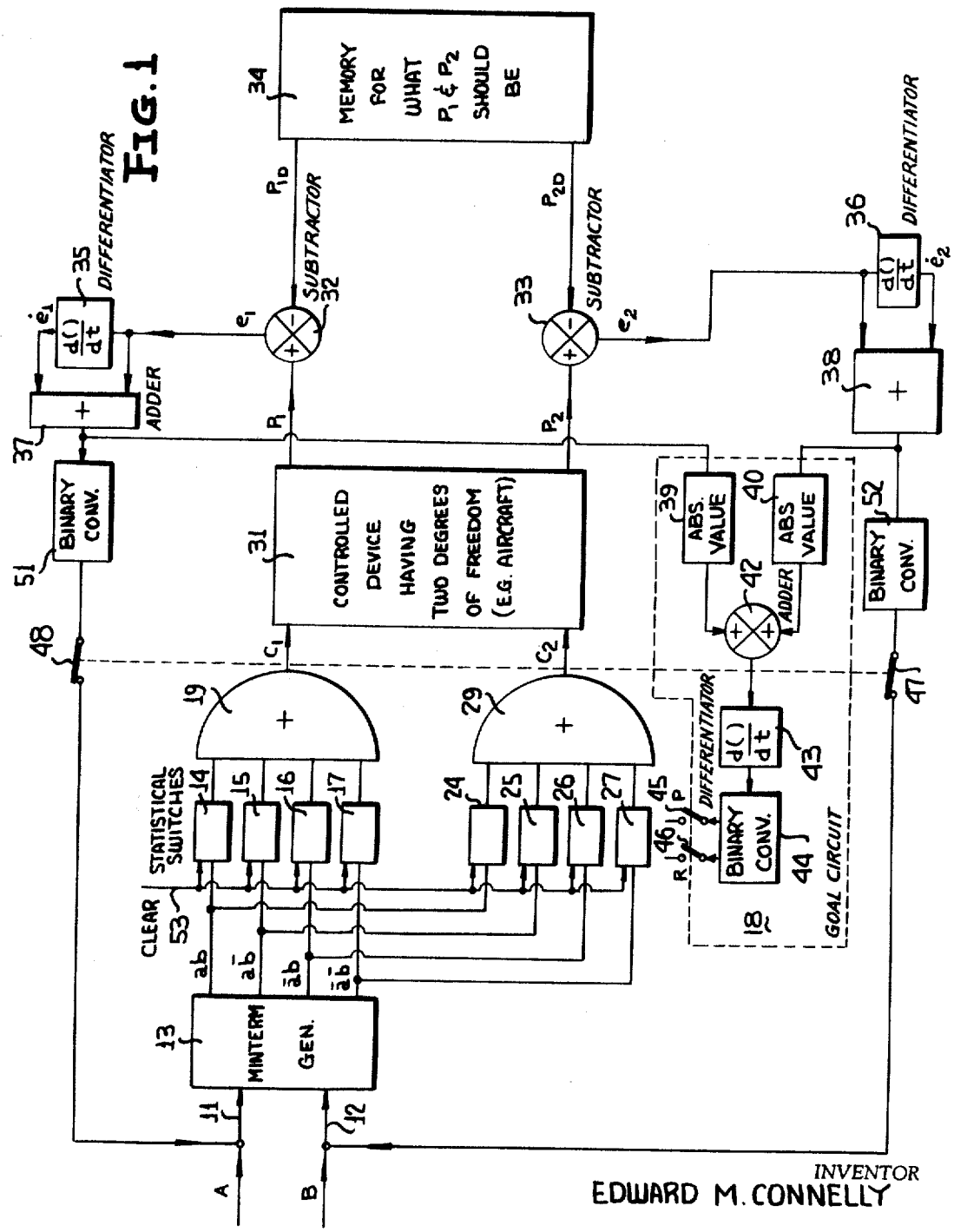

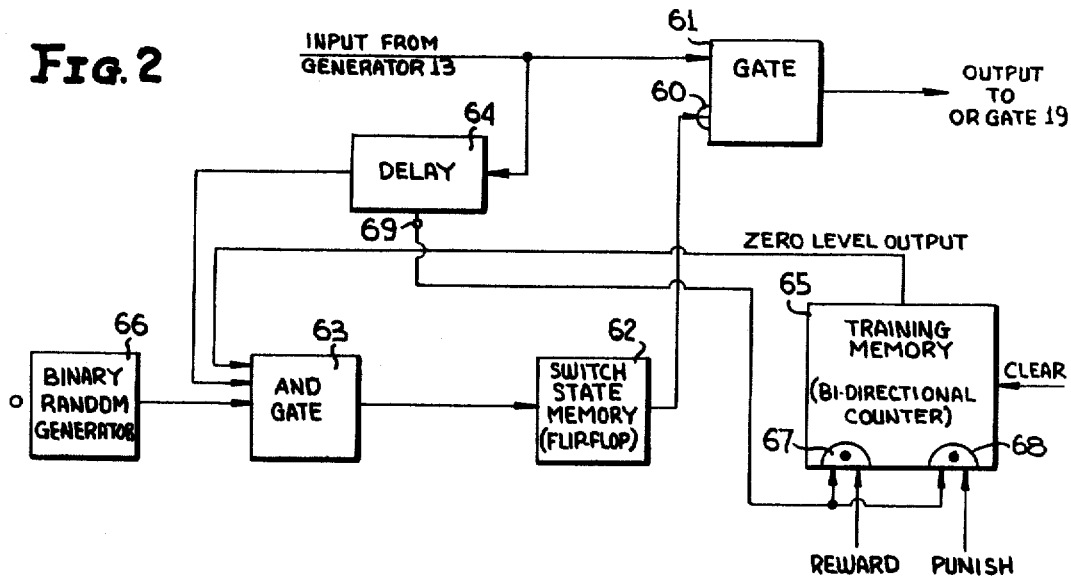
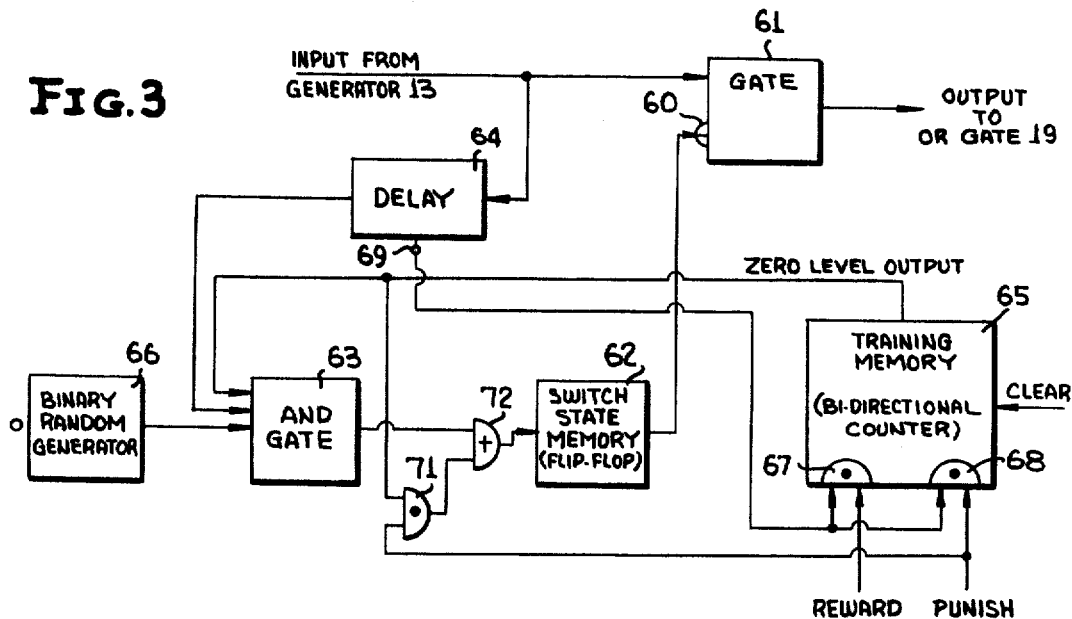

ABSTRACT OF THE DISCLOSURE

A statistical switch for trainable logical networks in which binary logical functions are developed for control or other purposes in response to binary input variables to the network, and in which switch control is manifested in accordance with reward and punishment signals generated as a result of the comparison between the actual and desired response of the network, the switch having a gate circuit to which binary input combinations are applied, and a counter which is incremented or decremented in response to the reward and punishment signals from a deterministic state of the switch of either minimum or maximum count, at which the gate circuit is statistically directed to pass or block signal, through all the other states (usually only one) at each of which the gate circuit is locked in a signal passing or blocking condition according to majority of training signals, i.e. reward or punishment, received.

---

The present invention relates generally to statistical switches particularly adapted for use in adaptive or self synthesizing systems and more particularly to such a switch that initially has a statistical probability of being open or closed and that is trained to be always open or closed once the system responds, as desired, to a particular combination of input signals.

In the co-pending applications of Robert J. Lee, Ser. No. 160,965, filed Sept. 14, 1961, entitled Self-Synthesizing Machine and Peter H. Halpern, Ser. No. 170,059 filed Jan. 31, 1962 entitled "Generalized Self-Synthesizer," there are disclosed systems capable of self synthesizing Boolean functions of two or more variables. In these systems, the canonical products of the inputs (e.g. the canonical products of A and B are $AB$, $A\bar{B}$, $\bar{A}B$ and $\bar{A}\bar{B}$) are formed and selectively gated through statistical switches. When the system is initially "learning" the particular function to be synthesized, the statistical switch has equal probabilities of passing and blocking canonical products having values of binary one. If the switch passes or blocks the binary one canonical product, as desired for a particular synthesis, that state of the switch is rewarded. Rewarding a switch increases the probability of it responding in the same way again the next time the particular binary one canonical product is derived. The opposite result occurs if the statistical switch responds in a manner contrary to that desired for the canonical product being synthesized. A switch retains the ability to respond contrary to the majority of its reward and punish inputs until the number of inputs of one type exceeds the number of the other type by a number considerably in excess of one, e.g. six.

The amount of apparatus required in each prior art switch to attain a fully trained status is quite extensive; a multi-state reversible counter with a digital to analog converter together with a complex logic gating network is required. When it is considered that the number of switches required to train a network to learn $m$ functions of $n$ variables is generally related $m2^n$, the desirability of reducing the number of components in each statistical switch becomes evident.

Another important factor relating to statistical switches is the speed with which they can be trained, i.e. the number of reward and punish learning signals that must be applied to a switch before it is trained. In the prior art switches, training time is usually quite prolonged because many occurrences of the same canonical product are required to train a switch completely.

I have found that for many applications, there is no need for a statistical switch having the ability to respond contrary to the majority of its learning signals. This is the opposite to what has been generally thought by those previously working in the field. A typical example of a system in which this need is obviated is disclosed by the co-pending application of Richard Mirabelli, entitled "Method and Apparatus for Training Self-Organizing, Networks," Ser. No. 409,550, filed Nov. 6, 1964, where there is disclosed a network that can be synthesized from a remote location.

According to the present invention, the statistical switch is arranged such that it initially has equal probabilities of passing and blocking its binary one canonical product input. If the switch initially responds correctly, it is rewarded and biased to respond always the same way the next time the particular binary one canonical product is derived. According to one embodiment of the invention if the switch initially responds incorrectly, it has equal probabilities of being open and closed the next time the particular canonical product is derived. In a second embodiment of the invention, a punish signal causes the switch to respond in the opposite way the next time the canonical product is derived. In both embodiments, after the switch responds to the first product signal that results in a reward, it remains in the state to which it was biased as a result of that product. It stays in that state as long as the number of punish signals occurring thereafter does not exceed the number of reward signals.

Because the switch is positively biased to either an open or closed state in response to a majority of the desired and actual responses once learning commences, the need for complex logic networks and digital to analog converters is obviated with the present invention. Instead, a reversible counter is utilized for directly deriving control voltages that determine whether the switch is invariably open or closed or if it has equal probabilities of being open or closed.

It is, accordingly, an object of the present invention to provide a new and improved statistical switch particularly adapted for use with adaptive systems.

Another object of the invention is to provide a statistical switch requiring fewer components and having shorter training time than prior art statistical switches.

Another object of the invention is to provide a statistical switch that is always opened or closed in response to majority agreement of its desired and actual responses.

A further object of the present invention is to provide a new and improved, simplified statistical switch that initially has equal probabilities of passing and blocking its inputs.

Still another object of the invention is to provide a statistical switch having a bi-directional counter that enables the switch state to be changed only when there is no majority agreement of switch desired and actual responses.

The above and still further objects, features and advantages of the present invention will become apparent upon consideration of the following detailed description of one specific embodiment thereof, especially when taken in conjunction with the accompanying drawings, wherein:

FIGURE 1 is a block diagram illustrating a typical system in which the statistical switch of the present invention is utilized;

FIGURE 2 is a block diagram of a preferred embodiment of the statistical switch of the present invention; and FIGURE 3 is a modification of FIGURE 2.

Reference is now made to FIGURE 1 of the drawing, a block diagram of a system that is capable of being synthesized to any Boolean function of two binary variables, A and B. The A and B binary input signals on leads 11 and 12 are applied to minterm generator 13 that derives all four canonical products AB, $A\overline{B}$, $\overline{A}B$, and $\overline{AB}$. The canonical products or minterms are applied through two sets of statistical switches 14–17 and 24–27 that are trained to be open or closed, i.e. to pass and block their inputs, in response to reward (R) and punish (P) signals deriving from goal circuit 18. Before training, switches 14–17 and 24–27 have equal probabilities of passing and blocking their inputs. The structure of minterm product generator 13 is more fully disclosed in the afore-mentioned co-pending Lee and Halpern applications.

If, for a particular combination of A and B inputs during statistical switch training, the actual system response corresponds with the desired system response, as indicated by goal circuit 18, a reward signal is derived from the goal circuit. The opposite conditions result in goal circuit 18 deriving a punish signal. The reward and punish signals deriving from goal circuit 18 are applied in parallel to all of the statistical switches. Those signals derived in response to each pair of A and B inputs affect only the statistical switches having binary one canonical products applied thereto for the particular pair of A and B inputs. Since only one minterm product can be a binary one at any time, only one switch connected to each of gates 19 and 29 is at any time rewarded or punished, e.g., if $A=B=1$, so $AB=1$, only switches 14 and 24 are affected by the reward and punish signals.

To determine if the switches of interest are rewarded or punished, in the illustrated system, the ouputs of switches 14–17 and 24 and 27 are combined separately in OR gates 19 and 29, respectively. OR gates 19 and 29 feed control inputs, $C_1$ and $C_2$, to controlled device 31, having two degrees of freedom in movement. Device 31 may be an aircraft in which binary one values of signals $C_1$ and $C_2$ respectively rotate the craft in one direction about different, independent axes while binary zero values of these signals maintain the craft stationary on these axes. In response to rotation of craft 31 about its axes, there are derived analog signals $P_1$ and $P_2$, indicative of the actual position of the craft with respect to these axes. The actual $P_1$ and $P_2$ positions of craft 31 are compared, in analog subtractors 32 and 33, with the desired craft positions, as indicated by analog signals $P_{1D}$ and $P_{2D}$. Signals $P_{1D}$ and $P_{2D}$, stored in memory 34, may vary with time or be fixed, according to the problem involved.

The position error signals, $e_1$ and $e_2$, deriving from subtractors 32 and 33, are respectively applied to differentiators 35 and 36, which respectively generate $\dot{e}_1$ and $\dot{e}_2$. To provide information regarding position error and rate of errors with respect to one axis of craft 31, the outputs of differentiator 35 and subtractor 32 are linearly combined in adder 37 to derive $e_1 + \dot{e}_1$. Similarly, $e_1 + \dot{e}_2$ is obtained by combining the outputs of differentiator 36 and subtractor 33 in adder 38.

The outputs of adders 37 and 38 are applied as inputs to separate absolute value circuits 39 and 40 of goal circuit 18. Circuits 39 and 40 are arranged such that their outputs are always positive and proportional to their inputs. These positive signals are combined in analog adder 42, the output of which feeds differentiator 43. The rate output of differentiator 43, negative only if craft 31 is rotating about its axes in directions away from the desired craft position, is applied to binary converter 44. Converter 44 derives a binary one signal on its reward (R) output lead if the output of differentiator 43 is positive or zero. For negative outputs of differentiator 43, the converter derives a punish (P) output.

During the training period, the outputs of goal circuit 18, derived from converter 44, are coupled to the switches that had binary one inputs thereto. If these switches produced the desired system response, as indicated by the output of converter 44, the states they occupied are rewarded. Once rewarded, the switches are biased into the rewarded states until the number of punish signals exceeds the total number of reward signals. If, however, the switches responding to binary one minterms initially produced the incorrect system response, a punish signal is derived by converter 44. The punish signal activates these switches so that upon the next occurrence of the same binary one minterm, there are still one half probabilities of each switch being open and closed.

After all four combinations of the A and B inputs on leads 11 and 12 have been processed through the system a number of times, switches 14–17 and 24–27 may be considered as trained to the Boolean function that will cause device 31 to rotate about its axis, as desired, in response to its A and B inputs. When the system is trained, a signal from an external device decouples the reward and punish outputs of a converter 44 from switches 14–17 and 24–27 by opening switches 45 and 46. Simultaneously in the system illustrated, a feedback loop is established between device 31 and the A, B inputs of generator 13 by closing switches 47 and 48. During the training interval, switches 47 and 48 are opened so leads 11 and 12 are responsive to signals derived from an independent training source.

With switches 47 and 48 closed, the A and B binary signal inputs on leads 11 and 12 control craft 31 to keep it rotating, as desired. This is accomplished by respectively deriving A and B as binary zeros if $(e_1 + \dot{e}_1)$ and $(e_2 + \dot{e}_2)$ are less than an analog zero for the previous pair of A and B inputs. To derive the A and B signals, binary converters 51 and 52, respectively responsive to the outputs of adders 37 and 38, are provided. When the input to converter 51 and 52 is an analog signal greater than or equal to zero, the converter derives a binary one output. In the opposite manner, converters 51 and 52 generate binary zero outputs when their inputs are negative. The outputs of converters 51 and 52 are simultaneously and periodically applied to leads 11 and 12 to derive sequential, distinct A and B binary signal system inputs.

A feature of the present invention is that statistical switches 14–17 and 24–27 are retrained as the characteristics of craft 31 alter. If, however, it is desired to retrain the network completely because the characteristics of craft 31 have altered greatly for example or when the network is initially put into operation, a clear signal is applied via lead 53, in parallel, to each of switches 14–17 and 24–27. The clear signal returns each switch to its initial condition, whereby there are equal probabilities of passing and blocking the canonical products derived from minterm product generator 13.

Reference is now made to FIGURE 2, a block diagram of a preferred embodiment of the statistical switch of the present invention. In the system of FIGURE 1, eight switches of the type illustrated by FIGURE 2 are required.

In FIGURE 2, a canonical product output of generator 13 is applied to one input of inhibit gate 61. When the inhibit input to gate 61, as derived from the output of flip flop 62, is a binary zero, gate 61 is open to pass its canonical product input. If, however, bistable flip flop 62 is in the opposite state, whereby a binary one is applied to the inhibit terminal 60 of gate 61, the gate blocks passage of its binary input, hence statistical switch output is zero regardless of the canonical product response of generator 13.

The state of bistable flip flop 62 is changed in response to the derivation of binary one outputs of AND gate 63, having inputs from delay network 64, the zero state of bidirectional counter 65 and random binary bit generator 66. Generator 66, which produces binary bits on a random basis so that equal numbers of zeros and ones are derived, may be a Zierler code generator or a white noise source feeding a binary converter such that ones and zeros are generated whenever the noise amplitude is respectively greater or less than a preselected reference level, e.g., zero.

Bidirectional counter 65, in effect the trained statistical switch memory, is responsive to the reward and punish signals generated by goal circuit 18. Each time a reward or punish signal is applied to counter 65, it is respectively incremented or decremented one count except when it is in its lowest, zero count state. When counter 65 is in the zero count state, it remains there even though a punish signal is derived.

Counter 65 is arranged so that it applies a binary one to AND gate 63 when it is in the zero count state; for all other count positions of counter 65, AND gate 63 cannot be activated because the counter applies a binary zero to AND gate 63. The number of states required of counter 65 for any given application depends on the probability of goal circuit 18 correctly generating reward and punish signals. If goal circuit 18 always correctly generates the reward and punish signal, counter 65 need only have two states and can be a bi-stable flip-flop. If, however, goal circuit 18 does not provide a reliable indication of the actual versus desired position of craft 13, the number of states in counter 65 must be increased to average the errors.

Delay network 64 is provided between the minterm product output of generator 13 and one input of AND gate 63 to enable the gate to be activated when a binary one product resulted in counter 65 being driven into the zero state. Thus, the delay time of network 64 must be sufficiently great to cover the time interval necessary for device 31 to respond to the outputs of OR gates 19 and 29 and the processing time of the signal through the system. A tap 69 on delay network 64 serves a similar purpose for activating counter 65 only when binary one canonical products are supplied to gate 61. The delayed voltage derived from tap 69 is applied in parallel to AND gates 67 and 68 at the reward and punish inputs to counter 65. The time interval required for the canonical one input to proceed from the input of network 64 to tap 66 is adjusted to equal the system response time from the output of gate 61 to the output of converter 44 so that the pulse at tap 69 occurs simultaneously with the reward and punish signals deriving from circuit 18.

To describe the operation of the switch illustrated in FIGURE 2, initially assume counter 65 to be set at zero when the canonical product input to gate 61 from generator 13 is a binary one and the state of flip flop 62 is binary zero. In consequence, gate 61 passes its input, a response is derived from craft 31 and it is assumed goal circuit 18 generates a punish signal that is applied to counter 65. Since counter 65 is in the zero state, it stays there and supplies a binary one input to AND gate 63 concurrently with the binary one signal applied to the AND gate by delay element 64. At the time these binary ones are applied to AND gate 63, random generator 66 is assumed to be deriving a binary one. In consequence, a binary one output is produced by gate 63 so that the state of flip flop 62 switches to a binary one. Flip flop 62 stays in this state until, at least, the next canonical product binary one is applied to gate 61. If the output of generator 66 was assumed to be a binary zero, flip flop 62 would have stayed in its zero state.

In response to the next canonical product binary one applied to gate 61, it is assumed that counter 65 is supplied with a reward signal so that it is advanced to state one. AND gate 63 cannot now be activated because the binary one output of delay network 64 does not occur concurrently with counter 65 being in the zero state. In consequence, flip flop 62 stays in its binary one state whereby gate 61 remains closed to prevent passage of its canonical product input. In consequence, when the next binary one canonical product is applied to gate 61, the gate output must be zero. It is assumed that the zero output of gate 61 again results in desired operation of craft 13 so that counter 65 is advanced to its second state, whereby flip flop 62 stays in its binary one condition and gate 61 remains closed. The state of counter 65 continues to be advanced in response to reward signals until its maximum count is reached, at which time the further application of reward signals has no effect on the counter state.

As indicated supra, the application of a punish signal to counter 65 lowers its state until zero is reached. To illustrate the point, let it be assumed that counter 65 and flip flop 62 are in state one when a binary one canonical product is applied to gate 61. Hence, a binary zero is derived by gate 61. Goal circuit 18, in response to this signal is assumed, however, to derive a punish signal that steps counter 65 back to its zero state. Just subsequent to counter 65 reaching its zero state, a pulse is derived at the output of delay network 64 so that AND gate 63 can be enabled by the output of generator 66. Since generator 66 has 0.5 probability of deriving a binary one, flip flop 62, hence gate 61, has the same chance of being switched. Gate 61 thereafter has equal probabilities of being open and closed until counter 65 receives a reward input and is driven to its first state.

With counter 65 in its zero state, a punish signal does not affect the switch state because there are equal probabilities that the state of gate 61 was correct even though the punish signal is derived. This is because two statistical switches always control the response of craft 31, one switch in group 14–17 and one in group 24–27. Since two switches are driven by the same reward and punish signals, there are equal probabilities that one switch was in the correct state and the other in the incorrect state when a goal circuit 18 derives a punish output.

To consider a specific instance, assume that the AB responsive switches 14 and 24 are desired to both be in the state where they pass their inputs to craft 31. In consequence, a reward signal is derived only when both switches 14 and 24 pass their binary one inputs. But assume that the counters of both switches are set at zero and that switch 14 initially passes its binary one input while the input to switch 24 is blocked. This results in a punish signal being derived by goal circuit 18. The punish signal does not affect counters 64 of switches 14 and 24 so that gates 61 of these switches have 0.5 probability of being open the next time $AB=1$ is derived by generator 13. If gates 61 of both switches 14 and 24 are open to pass the $AB=1$ canonical product the next time it is derived, the counters 65 of both switches are rewarded. For the next occurrence of $AB=1$, gates 61 of both switches 14 and 24 must be open.

While the system illustrated is preferred for functions of more than one variables, the switch may be modified if the reward and punish signals are derived only in response to the single canonical product passed through gate 61, i.e. if device 31 has only one degree of freedom so that OR gate 29 and switches 17–24 need not be included. In that event, the derivation of a punish signal when the state of counter 65 is zero invariably changes the state of flip flop 62, hence gate 61. This is accomplished as indicated in FIGURE 3 wherein the punish input to counter 65 and the counter zero state are combined in AND gate 71. Whenever a punish signal is derived simultaneously with counter 65 being in the zero state, AND gate 71 derives a binary one output that is coupled through OR gate 72 to change the state of flip flop 62. As in FIGURE 2, the state of flip flop 62 is changed in response to a binary one deriving from AND gate 63 via the connection between that gate and flip flop 62 through OR gate 72.

In FIGURE 3, counter 65 is arranged so that it is advanced from its zero to its first state even when a punish signal is derived. This is because the punish signal has assisted in training the switch. When counter 65 is above state zero, however, a punish signal decrements its state by one count.

Another difference between FIGURES 2 and 3 is that random code generator 66 need not necessarily be employed in the latter. This is because both the punish and reward signals train memory 65 to control flip flop 62.

While I have described and illustrated one specific embodiment of my invention, it will be clear that variations of the details of construction which are specifically illustrated and described may be resorted to without departing from the true spirit and scope of the invention as defined in the appended claims. For example, in certain instances, random generator 66 need not generate equal numbers of zeros and ones. The important consideration is that the number of zeros and ones be derived on some statistical basis.

I claim:

1. A statistical switch for use in adaptive systems in which canonical product signals are derived and, in response to the system output, reward and punish signals are derived, said switch comprising a gate responsive to a canonical product signal, and means responsive to said reward and punish signals for selectively always opening or closing said gate for said product signal as long as the number of punish signals does not exceed the number of reward signals for that canonical product once a reward signal is derived for that canonical product, said gate being open or closed on a statistical basis prior to derivation of any reward and punish signals.

2. The switch of claim 1 wherein the probabilities of said gate being initially open or closed are 0.5.

3. The switch of claim 1 wherein said means is biased on said statistical basis until a reward signal is generated in response to said canonical product signal.

4. The switch of claim 3 wherein said means is biased on said statistical basis after a reward signal is derived for said conical product signal when the number of reward and punish signals are equal.

5. The switch of claim 1 wherein said means is biased on said statistical basis only until said canonical product signal is derived, said means including means for maintaining said switch in the same state it occupied when said canonical product signal results in derivation of a reward signal and for changing the state of said switch when said canonical product signal results in the derivation of a punish signal.

6. A system for selectively passing or blocking an input signal, comprising a gate responsive to said input signal, a source of randomly occuring signal, a bi-directional counter, and means for changing the state of said gate in response to attainment of only one count of said counter and a predetermined state of said random signal.

7. The system of claim 6 wherein said means for changing is activated only in response to said one count and said predetermined signal state.

8. The system of claim 6 further including means for driving said counter in one direction and in a second direction and means for activating said means for changing when said counter is driven in only one of said directions simultaneously with said counter being in said one count.

No references cited.

ROBERT C. BAILEY, *Primary Examiner.*

R. ZACHE, *Assistant Examiner.*